(12) United States Patent
Baik et al.

(10) Patent No.: US 11,114,953 B2
(45) Date of Patent: Sep. 7, 2021

(54) CHARGE PUMP-BASED ARTIFICIAL LIGHTNING GENERATOR AND METHOD FOR MANUFACTURING SAME

(71) Applicants: Samsung Electronics Co., Ltd., Suwon-si (KR); UNIST (ULSAN NATIONAL INSTITUTE OF SCIENCE AND TECHNOLOGY), Ulsan (KR)

(72) Inventors: Jeong Min Baik, Ulsan (KR); Jin Sung Chun, Seoul (KR); Byeong Uk Ye, Daegu (KR)

(73) Assignees: Samsung Electronics Co., Ltd., Gyeonggi-do (KR); UNIST (ULSAN NATIONAL INSTITUTE OF SCIENCE AND TECHNOLOGY), Ulsan (KR)

(*) Notice: Subject to any disclaimer, the term of this patent is extended or adjusted under 35 U.S.C. 154(b) by 1100 days.

(21) Appl. No.: 15/525,993

(22) PCT Filed: Nov. 11, 2015

(86) PCT No.: PCT/KR2015/012094
§ 371 (c)(1),
(2) Date: May 11, 2017

(87) PCT Pub. No.: WO2016/076621
PCT Pub. Date: May 19, 2016

(65) Prior Publication Data
US 2017/0317611 A1 Nov. 2, 2017

(30) Foreign Application Priority Data

Nov. 11, 2014 (KR) .................. 10-2014-0156070
Nov. 10, 2015 (KR) .................. 10-2015-0157097

(51) Int. Cl.
*H02N 1/04* (2006.01)
*H02N 1/08* (2006.01)

(52) U.S. Cl.
CPC ............. *H02N 1/08* (2013.01); *H02N 1/04* (2013.01)

(58) Field of Classification Search
CPC ........................... H02N 1/04; H02N 1/08
(Continued)

(56) References Cited

U.S. PATENT DOCUMENTS

| 6,275,096 B1 | 8/2001 | Hsu et al. |
| 2011/0012476 A1* | 1/2011 | Chen ............ H01L 41/193 310/300 |

(Continued)

FOREIGN PATENT DOCUMENTS

| CN | 203534734 U | 4/2014 |
| CN | 203535772 U | 4/2014 |

(Continued)

OTHER PUBLICATIONS

Mukai et al, Machine Translation of JP2011015503, Feb. 2011 (Year: 2011).*

(Continued)

*Primary Examiner* — Quyen P Leung
*Assistant Examiner* — Eric Johnson
(74) *Attorney, Agent, or Firm* — Harness, Dickey & Pierce, P.L.C.

(57) ABSTRACT

A method for manufacturing a charge pump-based artificial lightning generator comprises the steps of: forming a second electrode on a prepared substrate; forming a negatively charged body having a sponge structure under the second electrode; removing spherical polymer particles from the negatively charged body using a toluene solution; allowing metal particles to penetrate into the negatively charged (Continued)

body; forming a positively charged body in a location which is at a predetermined distance below the negatively charged body in order to generate charges; nano-structuring the surface of the positively charged body; coating the nano-structured surface of the positively charged body with second metal particles; forming a ground layer for charge separation while maintaining a constant distance in the downward direction from one side of the positively charged body; and forming a first electrode for charge accumulation in a location which is at a predetermined distance below the positively charged body. Accordingly, the present invention can be miniaturized, can produce high-output energy from minute energy such as a wind, a vibration, or a sound, and can remarkably reduce costs incurred according to energy collection.

24 Claims, 6 Drawing Sheets

(58) Field of Classification Search
USPC .................................... 310/300, 309, 310
See application file for complete search history.

(56) References Cited

U.S. PATENT DOCUMENTS

| | | | |
|---|---|---|---|
| 2012/0228964 A1 | 9/2012 | Uesugi | |
| 2014/0300248 A1* | 10/2014 | Wang | H02N 1/04 310/300 |
| 2014/0338458 A1* | 11/2014 | Wang | G01H 11/06 73/658 |
| 2015/0091859 A1* | 4/2015 | Rosenberg | G06F 3/0445 345/174 |
| 2017/0331396 A1* | 11/2017 | Byun | H02N 1/04 |
| 2017/0331397 A1* | 11/2017 | Kim | H02N 2/18 |

FOREIGN PATENT DOCUMENTS

| | | | |
|---|---|---|---|
| CN | 203537269 U | | 4/2014 |
| CN | 203537270 U | | 4/2014 |
| JP | 2011015503 A | * | 1/2011 |
| JP | 2012-200132 A | | 10/2012 |
| KR | 10-2002-0093684 A | | 12/2002 |
| KR | 10-0433327 B1 | | 5/2004 |
| KR | 10-2012-0058414 A | | 6/2012 |
| KR | 101538082 B1 | * | 7/2015 |
| WO | WO2015003497 A1 | * | 1/2015 |

OTHER PUBLICATIONS

Wang et al, Machine Translation of WO2015003497 (Year: 2015).*
Wang, High-Efficiency Transfer of Percolating Nanowire Films for Stretchable and Transparent Photodetectors, Jul. 2014, Nanoscale, 6, pp. 10734-10739 (Year: 2014).*
Chun, Machine Translation of KR101538082, Jul. 2015 (Year: 2015).*
"Hydrophobic Sponge Structure-Based Triboelectric Nanogenerator", Keun Young Lee et al., Advanced Materials, 26, 5037-5042 (2014).
"Toward Large-Scale Energy Harvesting by a Nanoparticle-Enhanced Triboelectric Nanogenerator", Guang Zhu et al., American Chemical Society Publications, Nano Letters, 13, 847-853 (2013).
"Transparent Triboelectric Nanogenerators and Self-Powered Pressure Sensors Based on Micropatterned Plastic Films", Feng-Ru Fan et al., American Chemical Society Publications, Nano Letters.
"Stretchable Energy-Harvesting Tactile Electronic Skin Capable of Differentiating Multiple Mechanical Stimuli Modes", Steve Park et al., Advanced Materials, 26, 7324-7332 (2014).
"3D Stack Integrated Triboelectric Nanogenerator for Harvesting Vibration Energy", Weiqing Yang et al., Advanced Functional Materials, 24, 4090-4096 (2014).
Notice of Ground Rejection dated Aug. 3, 2020 in Japanese Application No. 2019-099491.
Decision of Rejection dated Feb. 4, 2019 in corresponding Japanese Application No. 2017-525573.

* cited by examiner

US 11,114,953 B2

CHARGE PUMP-BASED ARTIFICIAL LIGHTNING GENERATOR AND METHOD FOR MANUFACTURING SAME

CROSS-REFERENCE TO RELATED APPLICATIONS

This application is a national phase under 35 U.S.C. § 371 of PCT International Application No. PCT/KR2015/012094 which has an International filing date of Nov. 11, 2015, which claims priority to Korean Applications No. 10-2014-0156070, filed Nov. 11, 2014 and No. 10-2015-0157097, filed Nov. 10, 2015, the entire contents of each of which are hereby incorporated by reference.

TECHNICAL FIELD

The present invention relates to a charge-pump-based artificial lightning generator and a method of manufacturing the same and, more particularly, to a high-output charge-pump-based artificial lightning generator manufactured by employing a lightning generation principle in 'a charge pump (an integrated system of a charge generator, a charge isolator, and a charge accumulator)', developing new materials for charging objects of the charge pump system, designing devices, and implementing integrated system design, and a method of manufacturing the same.

The present invention also relates to a sustainably operable, environment-friendly, and high-output charge-pump-based artificial lightning generator manufactured by employing a charge accumulator using charge transfer between an electrostatic-induction-based grounding layer and a conductor to efficiently separate charges, designing a device structure based on vibration structure modeling, designing a system capable of efficiently using external energy, and ensuring reliability, and a method of manufacturing the same.

BACKGROUND ART

A strike of lightning in nature provides energy of about a billion joules or more to the ground surface. If the energy of lightning is transformable into electricity, a large amount of clean energy may be generated.

However, since an expansive lightning tower should be constructed and an energy output time is very short, efficiency of energy generation is low.

Lightning is caused by friction between water vapor molecules and ice crystals in a cumulonimbus cloud. Positive charges and negative charges generated due to the friction are effectively separated and accumulated in upper and lower parts of the cloud based on the density of the ice crystals, and a large number of charges are released due to a large potential caused by the charge separation. If the above technology is implementable with a palm size, the technology may be applied to various types of portable electronic products and used for auxiliary battery sources.

Energy generation due to friction uses charge transfer between materials caused when two charging objects are rubbed together, and may achieve a high output by using a small external stress due to a high energy transformation efficiency thereof compared to other systems for transforming small energy into electricity. In addition, temporal and spatial restrictions are small compared to the other systems for transforming small energy, e.g., heat or sunlight, into electricity. Furthermore, energy may be sustainably generated without fatigue which is generally caused by a typical energy harvesting technology for generating energy by using an internal strain of a piezoelectric material.

However, charges may not be uniformly distributed in charged surfaces due to restricted charge transfer between two charged objects, a low output current may be caused by much loss of charges generated in a device, and output characteristics may rapidly deteriorate at a low frequency.

In addition, since most parts of research conducted until now use existing silicon-based materials (e.g., polydimethylsiloxane (PDMS)), an innovative new material and structure capable of changing typical platforms are required.

PRIOR ART DOCUMENT

Patent Document

KR 10-0433327 (May 18, 2004)

DETAILED DESCRIPTION OF THE INVENTION

Technical Problem

Accordingly, the present invention provides a high-output charge-pump-based artificial lightning generator manufactured by employing a lightning generation principle in 'a charge pump (an integrated system of a charge generator, a charge isolator, and a charge accumulator)', developing new materials for charging objects of the charge pump system, designing devices, and implementing integrated system design, and a method of manufacturing the same.

The present invention also provides a sustainably operable, environment-friendly, and high-output charge-pump-based artificial lightning generator manufactured by employing a charge accumulator using charge transfer between an electrostatic-induction-based grounding layer and a conductor to efficiently separate charges, designing a device structure based on vibration structure modeling, designing a system capable of efficiently using external energy, and ensuring reliability, and a method of manufacturing the same.

Technical Solution

According to an aspect of the present invention, a method of manufacturing a charge-pump-based artificial lightning generator according to the present invention includes (a) forming a second electrode on a prepared substrate, (b) forming a sponge-structured negative charging object under the second electrode, (c) removing spherical polymer particles from the negative charging object by using a toluene solution, (d) inserting first metal particles into the negative charging object, (e) forming a positive charging object below the negative charging object at a location spaced apart from the negative charging object by a certain distance, to generate charges, (f) nanostructuring a surface of the positive charging object, (g) coating the nanostructured surface of the positive charging object with second metal particles, (h) forming a grounding layer below a side of the positive charging object while maintaining a certain distance from the positive charging object, to separate charges, and (i) forming a first electrode below the positive charging object at a location spaced apart from the positive charging object by a certain distance, to accumulate charges.

Advantageous Effects of the Invention

Based on a charge-pump-based artificial lightning generator and a method of manufacturing the same according to the present invention, a small generator may be produced, high-output energy may be generated by using small energy such as wind, vibration, or sound, and energy collection costs may be greatly reduced.

In addition, economical effects may be achieved by a source technology about new materials of charging objects and an original patent about a new-concept charge-pump-based device structure and charge pump system.

MODE OF THE INVENTION

Hereinafter, the present invention will be described in detail by explaining embodiments of the invention with reference to the attached drawings. The terms used in the specification and the claims should not be limited to conventional or lexical meanings and should be construed as having meanings and concepts corresponding to the technical idea of the present invention in order to the most appropriately describe the present invention.

It should be understood that there is no intent to limit embodiments of the invention to the particular forms disclosed, but conversely, embodiments of the invention are to cover all modifications, equivalents, and alternatives falling within the spirit and scope of the invention.

Figure 1:
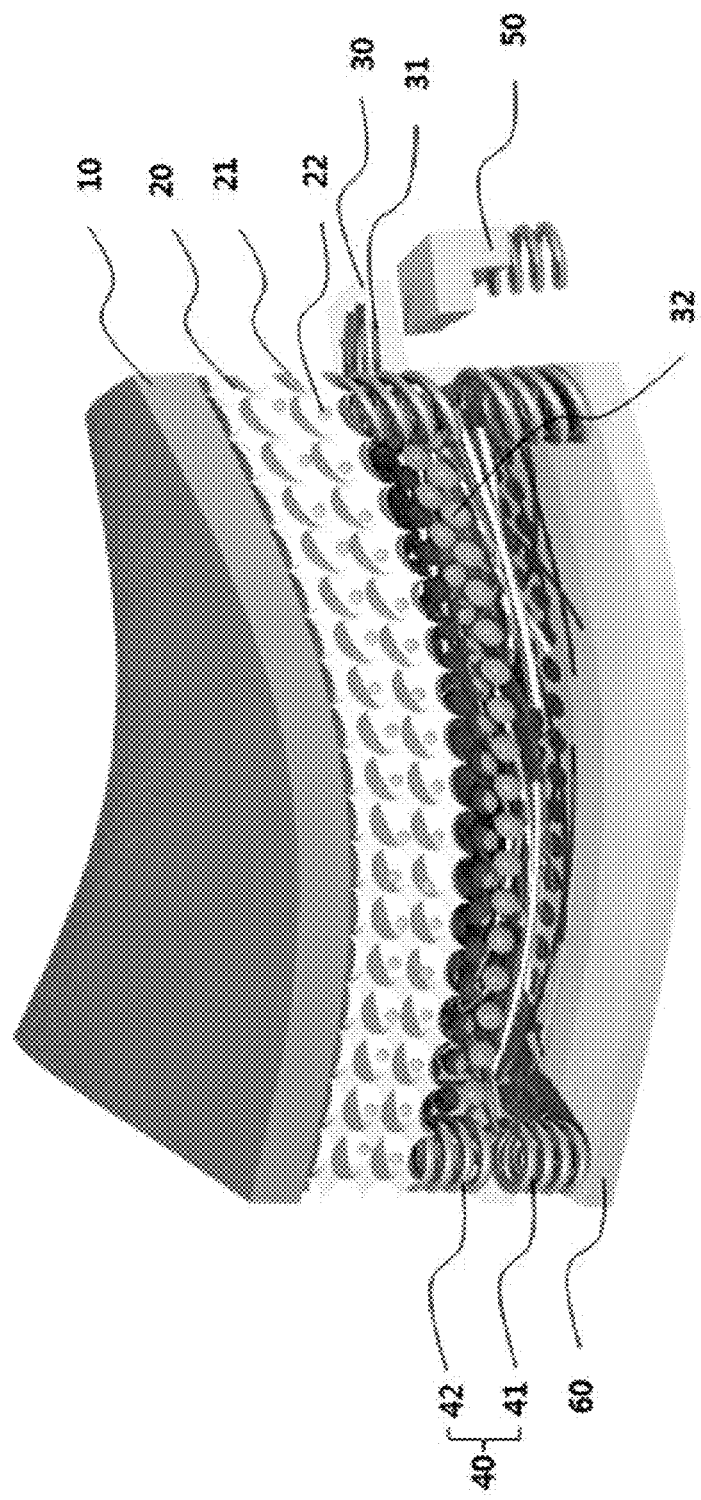
FIG. 1 is a conceptual view of a charge-pump-based artificial lightning generator according to the present invention.
Figure 2:
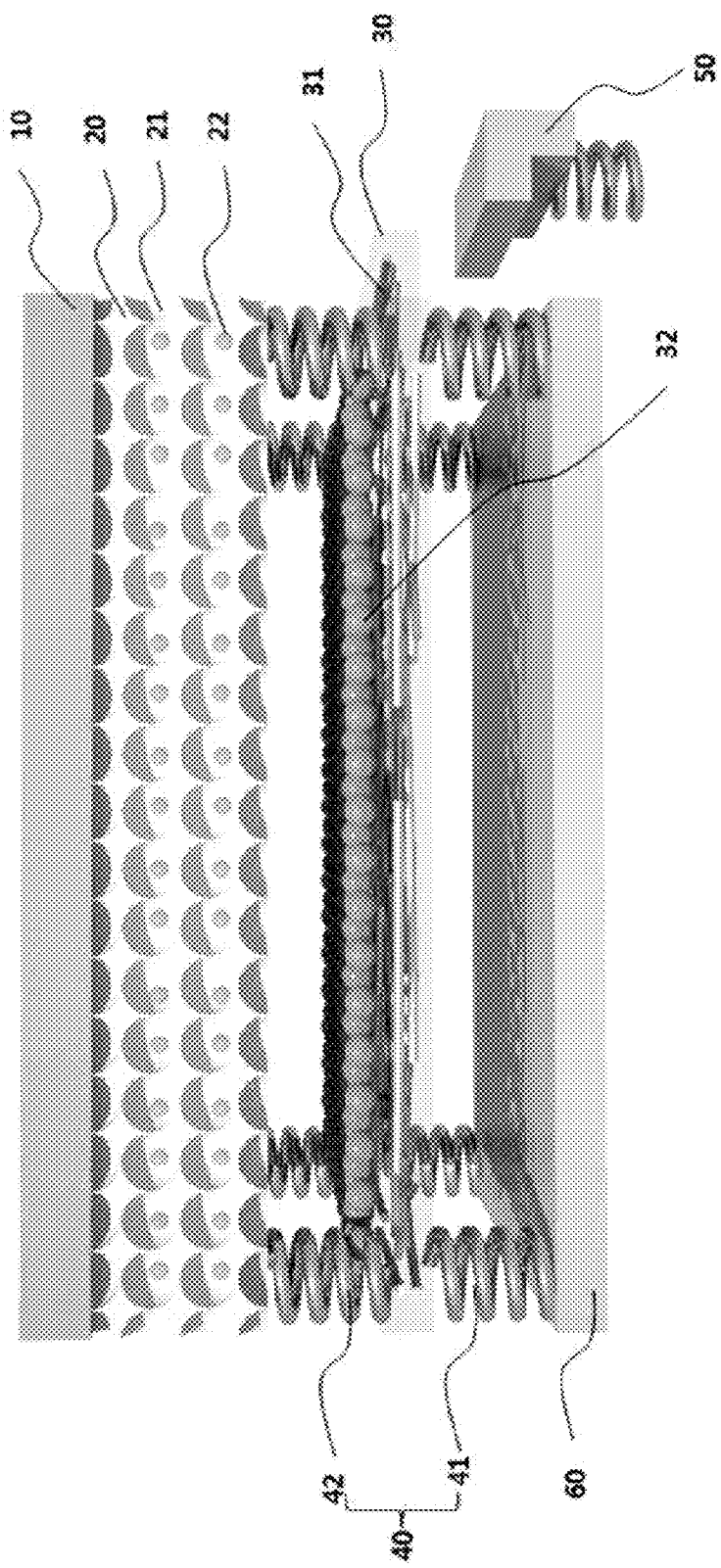
FIG. 2 is a cross-sectional view of the charge-pump-based artificial lightning generator according to the present invention.

FIG. 1 is a conceptual view of a charge-pump-based artificial lightning generator and a method of manufacturing the same according to the present invention, and FIG. 2 is a cross-sectional view of the charge-pump-based artificial lightning generator and a method of manufacturing the same according to the present invention.

As illustrated in FIGS. 1 and 2, the charge-pump-based artificial lightning generator and a method of manufacturing the same according to the present invention include a second electrode 10, a negative charging object 20, a positive charging object 30, supporters 40, a grounding layer 50, and a first electrode 60.

The second electrode 10 is configured as a monolayer or multilayer including at least one of aluminum (Al), nickel (Ni), chromium (Cr), platinum (Pt), gold (Au), and indium tin oxide (ITO) on a flexible substrate (not shown) including polyester (PET), polyethersulfone (PES), polyethylene naphthalate (PEN), Kapton, or the like.

The negative charging object 20 is provided under the second electrode 10 and is spaced apart from the positive charging object 30 to be described below, by a certain distance due to support of the supporters 40.

Particularly, the negative charging object 20 includes a sponge-structured polymer, and the size of pores 21 in the sponge-structured polymer is generally determined to be about 0.1 μm to about 100 μm depending on the size of spherical particles (e.g., polystyrene, silica, or polymethylmethacrylate (PMMA) particles) and the amount of distilled (DI) water.

The sponge-structured negative charging object 20 may include an organic polymer (e.g., polymethylmethacrylate (PMMA), polyethylene terephthalate (PET), polyetheretherketone (PEEK), polystyrene (PS), polyethylene (PE), or cyclic olefin copolymer (COC)) or an inorganic polymer (e.g., polydimethylsiloxane (PDMS) or ORMOCER).

The second electrode 10 and the negative charging object 20 are spaced part from the positive charging object 30 provided therebelow, by the certain distance, and generates a current and voltage due to an external stimulus or load.

The positive charging object 30 is provided below the negative charging object 20 to be spaced apart from the negative charging object 20 by the certain distance due to support of the supporters 40.

In this case, the positive charging object 30 uses a flexible material electrode, uses a composite-material electrode using silver (Ag) nanowires 31, and is coated with second metal particles 32 (e.g., Au, Ag, Al, Ni, or Pt particles) to enhance generation of charges.

Figure 3:
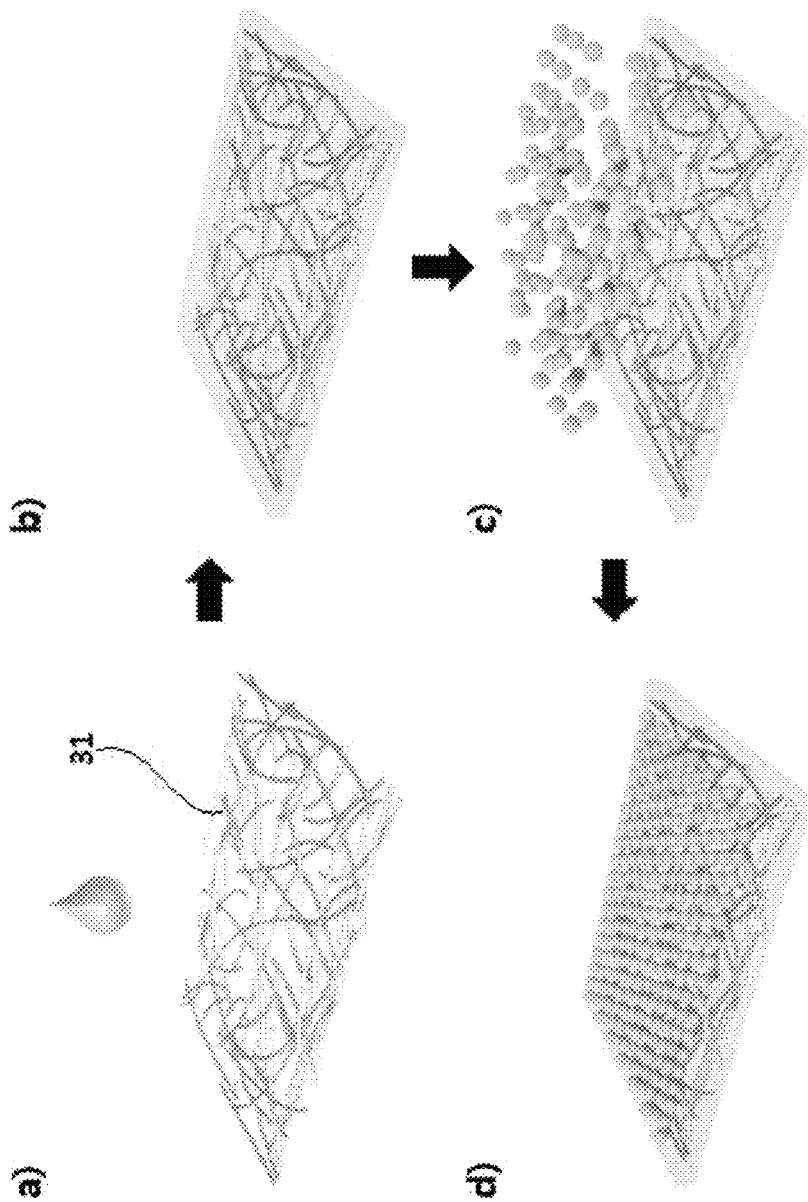
FIG. 3 is a view for describing a process of manufacturing a positive charging object of the charge-pump-based artificial lightning generator according to the present invention.

Specifically, a process of manufacturing the positive charging object 30 of the charge-pump-based artificial lightning generator according to the present invention is now described briefly with reference to FIG. 3.

To manufacture the composite-material electrode using the Ag nanowires 31, which is used as the positive charging object 30, the Ag nanowires 31 are evenly dispersed on a flat substrate by using spin coating as illustrated in operation (a) of FIG. 3, an elastic epoxy-based polymer is coated on the dispersed Ag nanowires 31 to form a composite thereof as illustrated in operation (b) of FIG. 3, and the second metal particles 32 (e.g., Au, Ag, Al, Ni, or Pt particles) are coated on top surfaces of the Ag nanowires 31 to enhance generation of charges as illustrated in operations (c) and (d) of FIG. 3.

Like the second electrode 10, the first electrode 60 is configured as a monolayer or multilayer including at least one of Al, Ni, Cr, Pt, Au, and ITO on a flexible substrate (not shown) including PET, PES, PEN, Kapton, or the like.

The supporters 40 includes first elastic supporters 41 and second elastic supporters 42. The first elastic supporters 41 are vertically provided at four corners of the first electrode 60 between the first electrode 60 and the positive charging object 30, and the second elastic supporters 42 are vertically provided at four corners of the positive charging object 30 between the positive charging object 30 and the second electrode 10.

The above-described first elastic supporters 41 and the second elastic supporters 42 are configured as elastic bodies, e.g., springs, to sensitively respond to an external stimulus or load, thereby utilizing generation of a current and voltage by the charge-pump-based artificial lightning generator and the method of manufacturing the same according to the present invention.

In this case, the first elastic supporters 41 and the second elastic supporters 42 may be configured as springs having different spring constants k to control an external load, and the magnitude and amplitude of vibration.

Specifically, the spring constant k of the second elastic supporters 42 may be 380 N/m, and the spring constant k of the first elastic supporters 41 may be 780 N/m to sustainably generate friction due to a single load.

The grounding layer 50 is provided between the first electrode 60 and a charge generation layer (e.g., the negative charging object 20 and the positive charging object 30), and may selectively remove negative charges from the positive charging object 30 due to grounding such that the positive charging object 30 charged with only positive charges efficiently accumulates charges in the first electrode 60 due to electrostatic induction.

In addition, the grounding layer 50 is inserted to selectively separate charges as described above, is configured as a monolayer or multilayer, and may include a material (e.g., metal, ceramic, or polymer) capable of selectively separating charges due to connection with the ground or an external device.

In this case, an elastic body, e.g., a spring, provided under the grounding layer 50 enables stable contact between the grounding layer 50 and the positive charging object 30 by absorbing an external load applied downward to the positive charging object 30.

The method of manufacturing the charge-pump-based artificial lightning generator according to the present invention is now described with reference to FIGS. 1 to 5.

Initially, a substrate (not shown) is prepared (S100).

The substrate may be a flexible substrate including PET, PES, PEN, Kapton, or the like.

Figure 5:
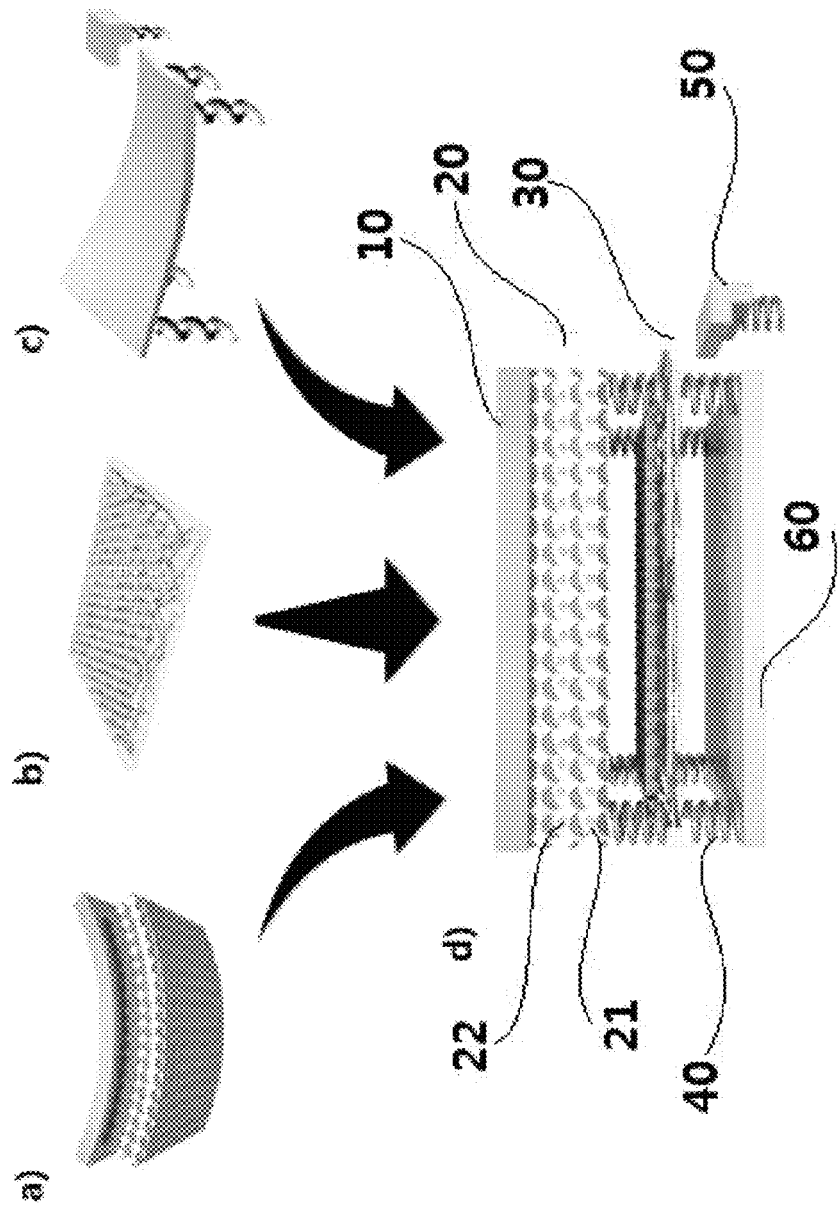
FIG. 5 is a view for describing a method of manufacturing the charge-pump-based artificial lightning generator according to the present invention.

As illustrated in FIG. 5, the second electrode 10 configured as a monolayer or multilayer including at least one of Al, Ni, Cr, Pt, Au, and ITO is formed on the substrate (S200).

The negative charging object 20 is formed on the second electrode 10 illustrated in operation (a) of FIG. 5 (S300).

The forming of the negative charging object 20 is now described in detail with reference to FIG. 4.

Figure 4:
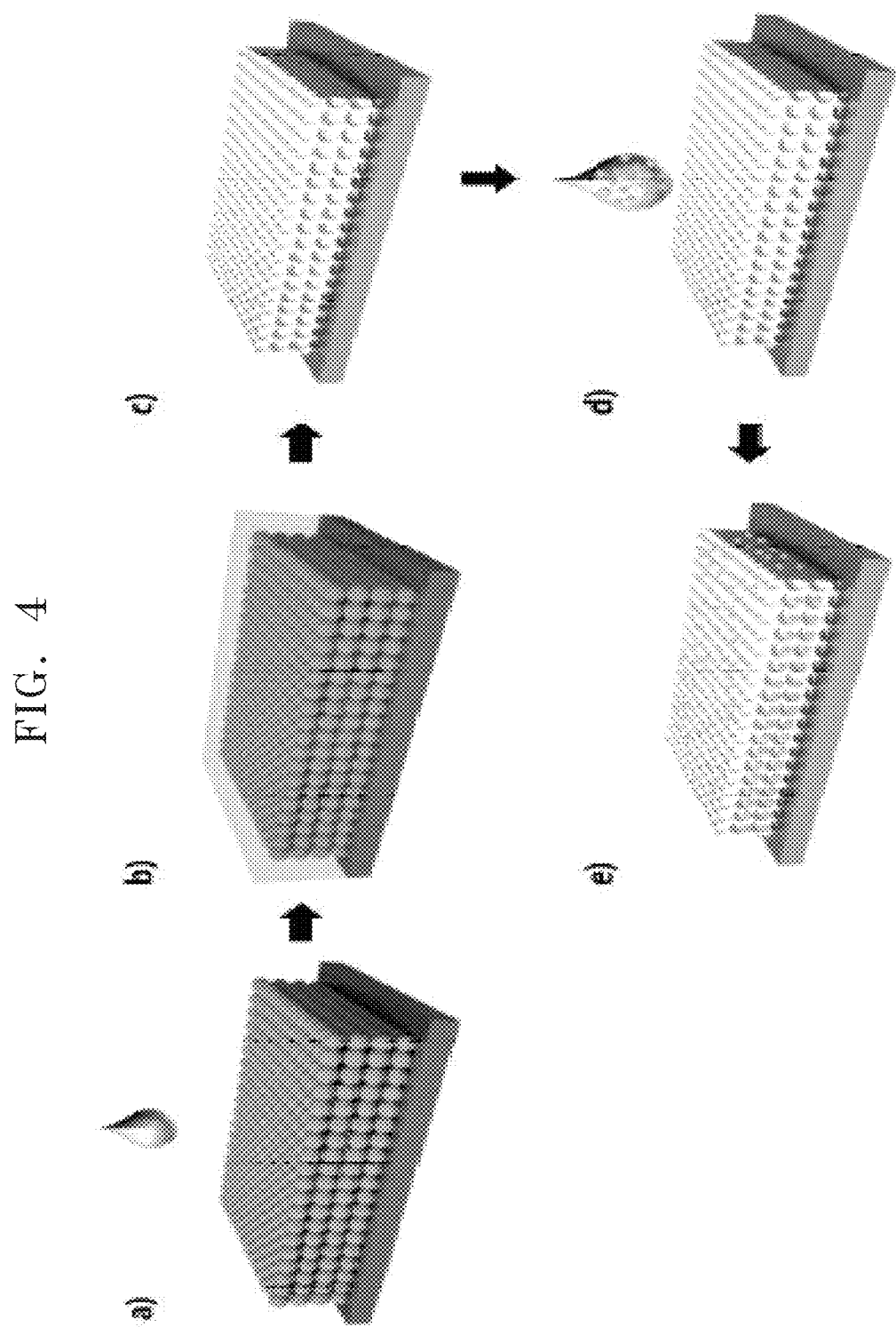
FIG. 4 is a view for describing a process of manufacturing a negative charging object of the charge-pump-based artificial lightning generator according to the present invention.

The forming of the negative charging object 20 (S300) includes mixing spherical polymer particles (e.g., polystyrene, silica, or PMMA particles) with a liquid as illustrated in operation (a) of FIG. 4 (S310), arranging the mixed spherical polymer particles (e.g., polystyrene, silica, or PMMA particles) as illustrated in operation (b) of FIG. 4 (S320), removing the liquid by drying the liquid in the air as illustrated in operation (c) of FIG. 4 (S330), mixing liquid-state negative charges with the spherical polymer particles as illustrated in operation (d) of FIG. 4 (S340), and filling the liquid-state negative charges between the spherical polymer particles as illustrated in operation (e) of FIG. 4 (S350).

In this case, as described above, the polymer of the negative charging object 20 may include an organic polymer (e.g., PMMA, PET, PEEK, PS, PE, or COC) or an inorganic polymer (e.g., PDMS or ORMOCER), may be uniformly coated due to spin coating, and may be maintained in a vacuum state to allow a polymer solution to permeate between the spherical polymer particles.

The liquid-state polymer may be heat-treated at 90° C. and transformed into a structure having flexible solid-state spherical polymer particles and a polymer.

Then, the spherical polymer particles separated from the substrate and included in the negative charging object 20 are removed from the negative charging object 20 by using a toluene solution (S400).

In this case, the spherical polymer particles are dissolved in the toluene solution for 8 to 24 hours to be completely removed and thus the negative charging object 20 has a sponge structure.

First metal particles 22 (e.g., Au, Ag, Al, Ni, or Pt particles) are formed in the sponge-structured negative charging object 20 (S500).

In this case, the first metal particles 22 may be mixed with the liquid and then inserted into the pores 21 of the sponge-structured negative charging object 20 together with the liquid in a vacuum state.

After the first metal particles 22 and the liquid are inserted into the pores 21, only the liquid may be selectively removed due to heat treatment at 90° C. and thus the sponge-structured negative charging object 20 having the first metal particles 22 in the pores 21 thereof are obtained.

Then, the positive charging object 30 is formed below the negative charging object 20 at a location spaced apart from the negative charging object 20 by a certain distance as illustrated in operation (b) of FIG. 5 (S600).

The positive charging object 30 uses a flexible material electrode and uses a composite-material electrode using the Ag nanowires 31.

A surface of the positive charging object 30 is nanostructured (S700).

The nanostructuring of the surface of the positive charging object 30 includes forming patterns on a silicon substrate by using photolithography (S710), removing an oxide layer by using a buffered oxide etchant (BOE) after the patterns are formed (S720), producing a mold having concaved lines, cubes, or pyramids corresponding to the shape of the formed patterns, by etching the silicon substrate by using a potassium hydroxide (KOH) solution (S730), spin-coating a non-cured Ag-nanowires-polymer composite on the produced mold (S740), removing air bubbles generated due to the spin-coating, in a vacuum state and then curing the Ag-nanowires-polymer composite by exposing the Ag-nanowires-polymer composite to ultraviolet light (S750), and removing the cured Ag-nanowires-polymer composite from the mold (S760). As such, a nanostructured pyramid-shaped surface structure may be obtained.

The second metal particles 32 (e.g., Au, Ag, Al, Ni, or Pt particles) are coated on the nanostructured surface of the positive charging object 30 to enhance generation of charges (S800).

The grounding layer 50 illustrated in operation (c) of FIG. 5 is formed below a side of the positive charging object 30 while maintaining a certain distance from the positive charging object 30 (S900).

In this case, the grounding layer 50 may be configured as a monolayer or multilayer including at least one of Al, Ni, Cr, Pt, Au, and ITO.

Lastly, an accumulation layer or the first electrode 60 illustrated in operation (c) of FIG. 5 is formed below the positive charging object 30 at a location spaced apart therefrom by a certain distance (S1000).

Due to the above-described operations S100 to S1000, the charge-pump-based artificial lightning generator according to the present invention is manufactured as illustrated in operation (d) of FIG. 5.

A method and principles of driving the above-described charge-pump-based artificial lightning generator according to the present invention are now described with reference to FIG. 6.

Figure 6:
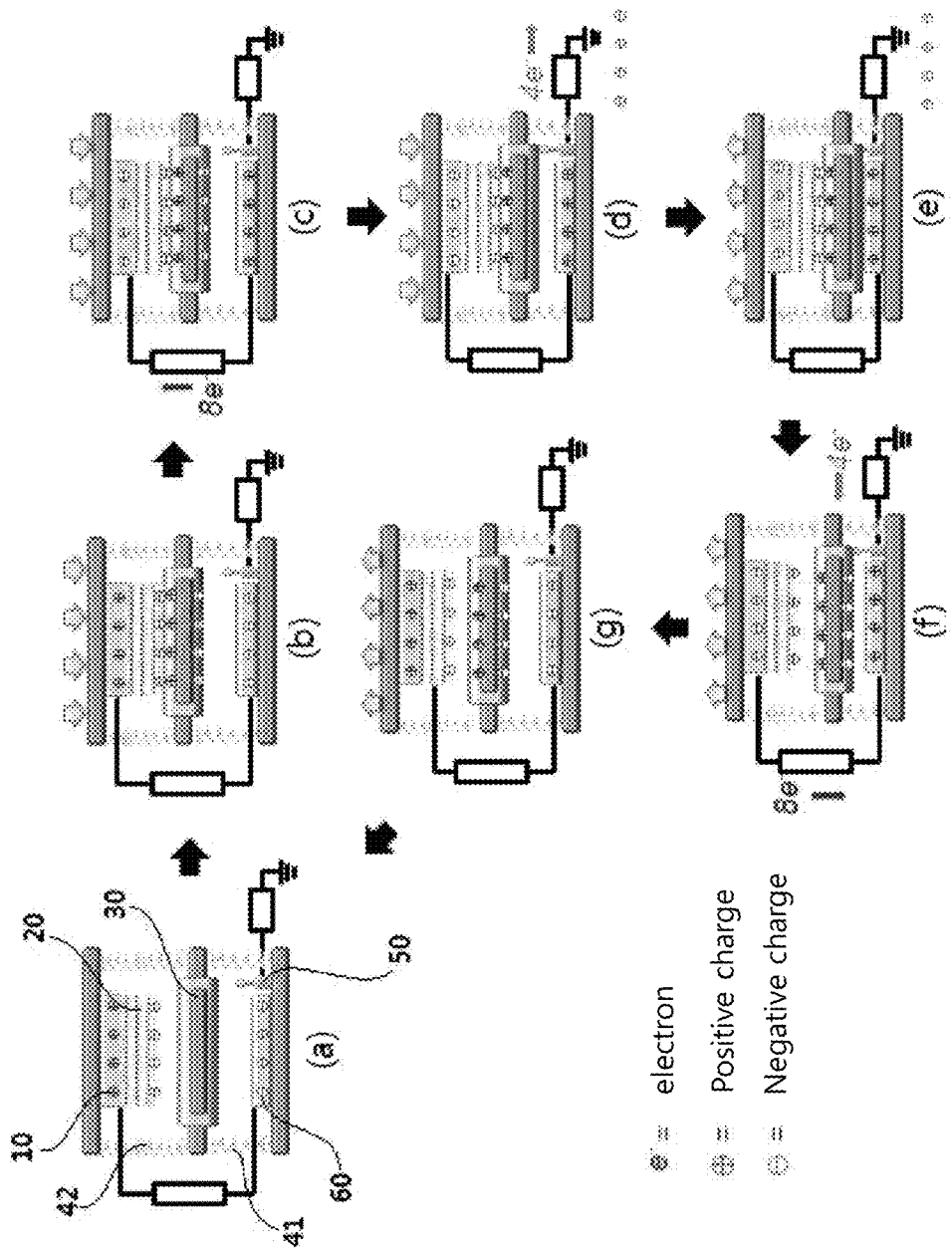
FIG. 6 is a view for describing a method and principles of driving the charge-pump-based artificial lightning generator according to the present invention.

As illustrated in operation (a) of FIG. 6, in an initial state, the negative charging object 20 has negative charges, the positive charging object 30 is neutral due to a combination of positive charges and negative charges separated to upper and lower parts of the positive charging object 30, the second electrode 10 loses electrons due to electrostatic induction caused by negative charges of the negative charging object 20 and thus is induced to positive charges, and the first electrode 60 is induced to negative charges.

In the above-described initial state, when an external load is applied to the charge-pump-based artificial lightning generator according to the present invention as illustrated in operation (b) of FIG. 6, the second elastic supporters 42 are compressed first due to different spring constants and thus friction occurs between the negative charging object 20 and the positive charging object 30.

In this case, charges of the positive charging object 30 are separated into positive charges and negative charges in upper and lower parts of the positive charging object 30 due to negative charges of the negative charging object 20, and electrons do not move to an external circuit due to charge equilibration in the charge-pump-based artificial lightning generator.

Then, when the external load is continuously applied to the charge-pump-based artificial lightning generator, as illustrated in operation (c) of FIG. 6, negative charges in the lower part of the positive charging object 30 induce positive charges onto a surface of the first electrode 60 and electrons move from the second electrode 10 to the first electrode 60 to generate an output current. Due to next compression of the first elastic supporters 41, as illustrated in operation (d) of FIG. 6, friction occurs between the lower part of the positive charging object 30 and the grounding layer 50 and negative charges of upper layers (e.g., the second electrode 10, the negative charging object 20, and the positive charging object 30) having a relatively large number of negative charges may be selectively separated through the grounding layer 50.

Ultimately, as illustrated in operation (e) of FIG. 6, friction occurs in every layer and, in this case, charges and electrons do not move due to charge equilibration in the charge-pump-based artificial lightning generator.

Then, as illustrated in operation (f) of FIG. 6, when the external load is removed, springs configured as the first elastic supporters 41 and the second elastic supporters 42 are almost simultaneously released. As such, with an extremely small time difference, the springs of the second elastic supporters 42 between the positive charging object 30 and the second electrode 10 are released first and then the springs of the first elastic supporters 41 between the positive charging object 30 and the first electrode 60 are released.

When the springs of the first elastic supporters 41 are released later, positive charges in an upper surface of the positive charging object 30 induce negative charges onto a lower surface thereof to receive electrons injected from the grounding layer 50 and, as illustrated in operation (g) of FIG. 6, negative charges of the negative charging object 20 induce positive charges onto the second electrode 10 to deliver electrons to the first electrode 60.

Consequently, after the external load is removed, charges and electrons do not move due to charge equilibration in the charge-pump-based artificial lightning generator, and separated positive charges and negative charges of the positive charging object 30 are combined to return to the neutral initial state as illustrated in operation (a) of FIG. 6. When the external load is repeatedly applied, an output is generated due to the above-described operation and charge transfer.

While the present invention has been particularly shown and described with reference to embodiments thereof, it will be understood by one of ordinary skill in the art that various changes in form and details may be made therein without departing from the spirit and scope of the present invention as defined by the following claims.

EXPLANATION OF REFERENCE NUMERALS

10: Second electrode
20: Negative charging object
21: Pores
22: First metal particles
30: Positive charging object
31: Ag nanowires
32: Second metal particles
40: Supporters
41: First elastic supporters
42: Second elastic supporters
50: Grounding layer
60: First electrode

The invention claimed is:

1. A charge-pump-based artificial lightning generator comprising:
   a first electrode;
   a positive charging object above and spaced apart from the first electrode;
   a negative charging object spaced apart from the positive charging object in a direction opposite to the first electrode;
   a second electrode contacting the negative charging object; and
   a grounding layer spaced apart from the positive charging object by a certain distance, the grounding layer configured to intermittently contact the positive charging object.

2. The charge-pump-based artificial lightning generator of claim 1, wherein, when an external load is applied, negative charges in a lower part of the positive charging object induce positive charges onto a surface of the first electrode and electrons move from the second electrode to the first electrode to generate an output current.

3. The charge-pump-based artificial lightning generator of claim 1, wherein the grounding layer comprises metal, ceramic, or polymer and selectively removes negative charges from the positive charging object due to grounding such that the positive charging object charged with only positive charges accumulates charges in the first electrode due to electrostatic induction.

4. The charge-pump-based artificial lightning generator of claim 1, wherein the negative charging object has a nanostructured surface comprising a sponge structure having a plurality of pores of 0.1 μm to 30 μm.

5. The charge-pump-based artificial lightning generator of claim 1, further comprising:
   first elastic supporters provided between the first electrode and the positive charging object; and
   second elastic supporters provided between the positive charging object and the second electrode.

6. The charge-pump-based artificial lightning generator of claim 5, wherein the first elastic supporters and the second elastic supporters comprise springs having different spring constants.

7. A method of manufacturing a charge-pump-based artificial lightning generator, the method comprising:
   (a) forming a second electrode on a prepared substrate;
   (b) forming a negative charging object under the second electrode;
   (e) forming a positive charging object below the negative charging object at a location spaced apart from the negative charging object by a certain distance, to generate charges;
   (f) nanostructuring a surface of the positive charging object;
   (g) coating the nanostructured surface of the positive charging object with second metal particles;

(h) forming a grounding layer below a side of the positive charging object while maintaining a certain distance from the positive charging object, to separate charges; and (i) forming a first electrode below the positive charging object at a location spaced apart from the positive charging object by a certain distance, to accumulate charges.

8. The method of claim 7, wherein the (b) comprises:

(b-1) arranging spherical polymer particles mixed with a liquid;

(b-2) removing the liquid by drying the liquid in air; and (b-3) filling liquid-state negative charges between the spherical polymer particles from which the liquid is removed.

9. The method of claim 8, further comprising (c) removing the spherical polymer particles from the negative charging object by using a toluene solution, after (b).

10. The method of claim 9, further comprising (d) inserting first metal particles into the negative charging object, after (c).

11. The method of claim 7, wherein the (f) comprises:

(f-1) forming patterns on a silicon substrate by using photolithography;

(f-2) removing an oxide layer by using a buffered oxide etchant (BOE) after the patterns are formed;

(f-3) producing a mold having concaved lines, cubes, or pyramids corresponding to the formed patterns, by etching the silicon substrate by using a potassium hydroxide (KOH) solution;

(f-4) spin-coating a non-cured silver (Ag)-nanowires-polymer composite on the produced mold;

(f-5) removing air bubbles generated due to the spin-coating, in a vacuum state and then curing the Ag-nanowires-polymer composite by exposing the Ag-nanowires-polymer composite to ultraviolet light; and (f-6) removing the cured Ag-nanowires-polymer composite from the mold.

12. The method of claim 7, wherein the grounding layer comprises metal, ceramic, or polymer and selectively removes negative charges from the positive charging object due to grounding such that the positive charging object charged with only positive charges accumulates charges in the first electrode due to electrostatic induction.

13. The method of claim 7, wherein, when an external load is applied, negative charges in a lower part of the positive charging object induce positive charges onto a surface of the first electrode and electrons move from the second electrode to the first electrode to generate an output current.

14. The method of claim 7, wherein first elastic supporters are provided between the first electrode and the positive charging object, and wherein second elastic supporters are provided between the positive charging object and the second electrode.

15. The method of claim 14, wherein the first elastic supporters and the second elastic supporters comprise springs having different spring constants k.

16. The method of claim 7, wherein the negative charging object has a nanostructured surface comprising a sponge structure having a plurality of pores of 0.1 μm to 30 μm.

17. A method of manufacturing a negative charging object of a charge-pump-based artificial lightning generator, the method comprising:

(A1) mixing spherical polymer particles with a liquid;

(A2) arranging the spherical polymer particles mixed with the liquid;

(A3) removing the liquid by drying the liquid in air;

(A4) mixing liquid-state negative charges with the spherical polymer particles; and (A5) filling the liquid-state negative charges between the spherical polymer particles, wherein the spherical polymer particles include at least one of polystyrene, silica, or polymethylmethacrylate (PMMA) particles.

18. The method of claim 17, further comprising:

(A6) forming pores by removing the spherical polymer particles, wherein the liquid comprises first metal particles, and wherein the first metal particles are inserted into the pores of the negative charging object.

19. A method of manufacturing a positive charging object of a charge-pump-based artificial lightning generator, the method comprising:

(B1) evenly dispersing silver (Ag) nanowires on a flat substrate by using spin coating;

(B2) coating an elastic epoxy-based polymer on the dispersed Ag nanowires to form a composite thereof; and (B3) coating second metal particles on top surfaces of the Ag nanowires.

20. A charge-pump-based artificial lightning generator comprising:

a first electrode;

a first charging object above and spaced apart from the first electrode;

a second charging object spaced apart from the first charging object in a direction opposite to the first electrode;

a second electrode contacting the second charging object; and a grounding layer spaced apart from the first charging object by a certain distance, the grounding layer configured to intermittently contact the first charging object.

21. The charge-pump-based artificial lightning generator of claim 20, further comprising:

first elastic supporters provided between the first electrode and the first charging object; and second elastic supporters provided between the first charging object and the second electrode.

22. The charge-pump-based artificial lightning generator of claim 20, wherein the first charging object comprises silver (Ag) nanowires.

23. The charge-pump-based artificial lightning generator of claim 22, wherein the first charging object further comprises metal particles comprising at least one of gold (Au), silver (Ag), aluminum (Al), nickel (Ni), and platinum (Pt).

24. The charge-pump-based artificial lightning generator of claim 20, wherein the second charging object comprises an organic polymer or an inorganic polymer.

* * * * *